A. W. COOPER & J. SUTCLIFFE.
Pipe-Coupling.

No. 163,463.

Patented May 18, 1875.

UNITED STATES PATENT OFFICE.

ARTHUR W. COOPER AND JOHN SUTCLIFFE, OF CHICAGO, ILLINOIS.

IMPROVEMENT IN PIPE-COUPLINGS.

Specification forming part of Letters Patent No. 163,463, dated May 18, 1875; application filed June 24, 1874.

*To all whom it may concern:*

Be it known that we, A. W. COOPER and JOHN SUTCLIFFE, of the city of Chicago, in the county of Cook and State of Illinois, have invented certain new and useful Improvements in Pipe-Couplings, of which the following is a specification:

This invention relates to certain improvements in coupling attachments for uniting pipe or hose of soft yielding material, and is principally intended for coupling sections of lead pipe to take the place of the soldered joints by which such sections have heretofore been united, although it may be applied with advantage to pipes or hose of rubber, gutta-percha, and other similar material.

The ordinary soldered joints, by which the sections of lead pipe are usually united, have proved inconvenient and expensive in practice, from the fact that they can only be applied by skilled workmen at a great outlay of time, and various devices have been contrived to dispense with the same, but hitherto without success. Such devices have generally consisted of a short tube provided with a screw-thread and nut at each end, constructed in such manner as to strip or throw up the metal of the tube at the ends, and bind or clamp the portions thus stripped or thrown up to form the joint. These devices have proved defective from the fact that when stripped up the metal is liable to be entirely stripped off, leaving the ends of the pipe loose in the attachment, or the portion thus stripped up is left in so weak a condition that it will bear but little pressure or strain, rendering the joint liable to break and become utterly worthless, and when thrown up the end of the pipes are so completely forced from between the clamping-surfaces as to form a defective or utterly worthless joint.

The present invention is designed to overcome these defects; and it consists of a short tube made conical or tapering at each end, and provided with male screws at opposite ends, the space between the two being polygonally-shaped for the application of a wrench, said male screws being provided with female screw-nuts adapted to fit their respective threads, the screw-nuts being bored straight for a greater portion of their length, and then gradually tapering or narrowing down to the opening for the end of the pipe, the screw terminating at the beginning of the narrowed portions, which are left with plain surfaces.

Figure 1:
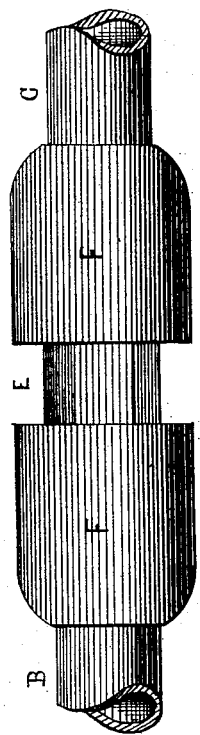
Figure 2:
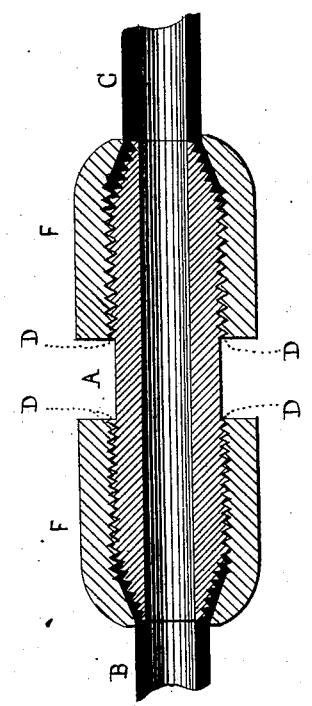

In the drawings, Figure 1 represents an external view of the improved coupling attachment applied to the sections of pipe, and Fig. 2 is a sectional view of the same.

The letter A represents the coupling-tube, made tapering or conical at each end, and having a right-hand male screw, $A^1$, formed on one end, and a left-hand male screw, $A^2$, formed upon the other. These screws extend from points each side of a point midway between the ends of the said tube to the extremities of the same, the intermediate space E being polygonally-shaped on the outside for the reception of a wrench to assist in turning the tube in coupling or uncoupling the pipes. The tubes F and F' represent two screw-nuts—one provided with a right-hand female screw-thread to fit over the corresponding screw on one end of the tube, the other with a left-hand female thread to fit over the left-hand screw on the opposite end. Said screw-nuts are provided with straight bores extending from the ends, which are attached to the tube A nearly to the opposite ends, from which points the bores are gradually narrowed or tapered to the extremities. The ends of the pipe-sections are indicated by the letters B C. The attachment is secured to said ends by first slipping the nuts over the same, spreading or distending the said ends by means of a cone of hard wood or otherwise. The nuts are then slipped up over the ends of said pipes until they project sufficiently to catch the threads on the ends of the tube A, which is then forced home by turning. The screw-threads on the ends of the tube A, and the threads on the interior of the nuts, pulling in opposite directions, effectually hold the ends of the pipe in position while drawing the metal tightly between the clamping-surfaces, by which it is securely held and packed, forming a perfectly tight and reliable joint. After being once applied, the attachment may be readily coupled and uncoupled without injuring the screw-threads on the ends of the pipes, allowing the same to be separated for the purpose of cleaning or repair, and again united with the utmost facility.

The polygonal portion of the tube A being below the exterior surfaces of the nuts, the same form a convenient guide for a wrench to assist in coupling and uncoupling the attachment. Such intermediate portion also serves as a convenient point to attach a faucet or cock, which may be inserted in a hole bored and tapped for the purpose, obviating the necessity of inserting the same by the soldered joints hitherto employed, forming a joint that may be readily uncoupled when necessary, and as readily coupled afterward.

What we claim is—

The combination of the externally-threaded tube A, provided with conical threaded ends, with the internally-threaded nuts F F', provided with plain conical internal bearing-surfaces at the ends, as set forth, for the pipes B and C, and adapted to work together and form an external and internal screw-thread upon the enlarged ends of said pipes, while the clamping-surfaces are brought together upon the same, to form the packing and secure the joint, substantially as herein described.

In testimony that we claim the foregoing we have hereunto set our hands.

ARTHUR W. COOPER.
JOHN SUTCLIFFE.

Witnesses:
A. C. CLEVELAND,
W. H. BOOMER.